United States Patent
Remes (10) Patent No.: US 12,009,194 B2
(45) Date of Patent: Jun. 11, 2024

(54) MASS SPECTROMETRY DATA-INDEPENDENT ANALYSIS METHODS WITH IMPROVED EFFICIENCY

(71) Applicant: THERMO FINNIGAN LLC, San Jose, CA (US)

(72) Inventor: Philip M. Remes, Livermore, CA (US)

( * ) Notice: Subject to any disclaimer, the term of this patent is extended or adjusted under 35 U.S.C. 154(b) by 0 days.

(21) Appl. No.: 17/550,845

(22) Filed: Dec. 14, 2021

(65) Prior Publication Data

US 2023/0187192 A1    Jun. 15, 2023

(51) Int. Cl.
*H01J 49/00* (2006.01)
*G01N 30/86* (2006.01)
*H01J 49/42* (2006.01)

(52) U.S. Cl.
CPC ...... *H01J 49/0036* (2013.01); *G01N 30/8631* (2013.01); *H01J 49/0045* (2013.01); *H01J 49/421* (2013.01)

(58) Field of Classification Search
CPC .. H01J 49/0036; H01J 49/0045; H01J 49/421; G01N 30/8631
USPC .................................. 250/281, 282
See application file for complete search history.

(56) References Cited

U.S. PATENT DOCUMENTS

| | | | |
|---|---|---|---|
| 8,809,772 B2 | 8/2014 | Bonner et al. | |
| 9,269,553 B2 | 2/2016 | Bonner et al. | |
| 9,911,585 B1 | 3/2018 | Zabrouskov | |
| 10,651,019 B2 | 5/2020 | Isosev et al. | |
| 11,107,666 B2 | 8/2021 | Bonner et al. | |
| 11,222,775 B2 * | 1/2022 | Bonner | H01J 49/004 |

(Continued)

FOREIGN PATENT DOCUMENTS

| | | | | |
|---|---|---|---|---|
| EP | 3193352 A1 * | 7/2017 | .......... | G01N 27/622 |
| EP | 3193352 A1 | 7/2017 | | |

(Continued)

OTHER PUBLICATIONS

Gillet, et al., "Targeted Data Extraction of the MS/MS Spectra Generated by Data-independent Acquisition: A New Concept for Consistent and Accurate Proteome Analysis", Molecular & Cellular Proteomics 11.6, 2012, pp. 1-17.

(Continued)

*Primary Examiner* — Michael Maskell
(74) *Attorney, Agent, or Firm* — Thomas F. Cooney (57) ABSTRACT

A method of data-independent mass spectrometric analysis of compounds of a compound class of interest comprises: determining or retrieving a distribution, over a mass-to-charge (m/z) ratio range of interest, of a number of primary ion species of members of said compound class having m/z ratios within each respective one of a plurality of m/z sub-ranges of the m/z ratio range of interest; defining m/z positions of a set consisting of a number, $n_{sb}$, of finite-width bins, within the m/z ratio range of interest, the set of bins excluding m/z sub-ranges within the m/z ratio range of interest that encompass fewer than a threshold number, $t_{sb}$, of the primary ion species, wherein the defining based on the determined or received distribution; and performing a plurality of tandem mass analyses, each tandem mass analysis pertaining to primary ion species within a respective one of the defined bins.

17 Claims, 9 Drawing Sheets

(56) References Cited

U.S. PATENT DOCUMENTS

| | | | | |
|---|---|---|---|---|
| 11,378,560 | B2* | 7/2022 | Huang | H01J 49/0045 |
| 2016/0079047 | A1* | 3/2016 | Bonner | H01J 49/004 |
| | | | | 250/281 |

FOREIGN PATENT DOCUMENTS

| | | |
|---|---|---|
| EP | 44047371 A1 | 8/2022 |
| GB | 2594580 A | 3/2021 |

OTHER PUBLICATIONS

Venable et al., "Automated approach for quantitative analysis ofcomplex peptide mixtures from tandem mass spectra", Nature Methods, 2004, vol. 1 (1), pp. 1-7.

Arnhard et al. "Sequential Windowed Acquisition for All Theoretical Fragment Ion Mass Spectra' (SWATH) for Systematic Toxicological Analysis with Liquid Chromatorgraphy-High-Resolution Tandem Mass Spectrometry" Analytical Bioanalysis Chemistry, Nov. 1, 2014, 10 pages.

Elmiger et al. "Parameter Optimization for Feature and Hit Generation in a General Unknown Screening Method-Proof of Concept Study Using a Design of Experiment Approach for a High Resolution Mass Spectrometry Procedure after Data Independent Acquisition" Analytical Chemistry, Feb. 3, 2018, 18 pages.

Li et al. "Direct Infusion—Tandem Mass Spectrometry Combining with Data Mining Strategies Enables Rapid Chemome Characterization of Medical Plants: A Case Study of Polygala Tenuifolia" Journal of Pharmaceutical and Biomedical Analysis, No. 204, Jul. 22, 2021, 9 pages.

EP Extended Examination Search Report dated May 25, 2023, to EP Patent Application No. 22211634.5.

* cited by examiner

MASS SPECTROMETRY DATA-INDEPENDENT ANALYSIS METHODS WITH IMPROVED EFFICIENCY

FIELD OF THE INVENTION

The present invention relates to mass spectrometry and mass spectrometers. More particularly, the present invention relates to data-independent analysis methods of mass spectrometry and mass spectrometers that are configured to perform data-independent analysis methods.

BACKGROUND OF THE INVENTION

Tandem mass spectrometry has become the method of choice for fast and efficient identification and/or quantification of analytes in complex multi-component mixtures. In general practice, tandem mass spectrometric information is obtained by ideally selecting and isolating single ion species (of a single mass-to-charge ratio, or m/z, value or of a restricted range of m/z values) and subjecting such so-isolated precursor ions to fragmentation so as to yield product ions that can be used to identify individual analytes. Ion fragmentation can be provided by various methodologies and mechanisms including collision-induced dissociation (CID), infrared multiphoton dissociation (IRMPD), etc. In these dissociation methods, kinetic or electromagnetic energy is imparted to the ions, whereby the introduced energy can initiate bond breakage to form fragment ions.

In one form of tandem mass spectrometry experiment, known as an "MS/MS" or, alternatively, "MS2" experiment, one or more ion species of particular selected mass-to-charge (m/z) values are isolated (that is, purified by expulsion of other ions), often but not necessarily sequentially. The isolated ions are then fragmented and the fragment ions are mass analyzed. This sequence of events may be iterated. Specifically, a next such "iteration" is the selection and isolation of particular fragment-ion species, these selected and isolated fragment ions thus becoming a new generation of precursor ions, and further fragmentation of the so-isolated fragments followed by mass analysis of the resulting product ions. A resulting product-ion mass spectrum will exhibit a set of fragmentation peaks which may be used to identify a compound and which, in many instances, may be used as a means to derive structural information relating to the original molecule from which the originally isolated first-formed precursor ions were generated.

In general, mass spectrometric structural elucidation of ionized molecules of complex or moderately complex structure is often carried out using a mass spectrometer that is coupled to a chromatograph. The general techniques of conducting mass spectrometry (MS) analysis of ions generated from compounds separated by chromatography (e.g., liquid chromatography (LC), gas chromatography (GC), ion chromatography (IC), etc.) are referred to by acronyms such as "LC-MS", "GC-MS", "IC-MS", etc. In such studies, a chromatograph is used to effect at least partial separation of an initial mixture of molecules into separate fractions, and a mass spectrometer is utilized in an attempt to identify and/or quantify the molecules in each fraction. The most basic type of information that is provided by a mass spectrometer is a list of the mass-to-charge ratios (m/z) of the ions that are present in the analyzed fraction and the signal intensity measured at each such m/z value.

In the general study of polypeptides and protein molecules, the loci of bond breakage that results in fragment-ion formation is reasonably well understood under certain controlled fragmentation conditions. Thus, the types of fragments that may be generated under the application of such controlled conditions may be readily predicted and, as a result, basic MS2 experiments may be sufficient to identify or characterize various protein or polypeptide analytes in terms of their amino acid sequences. Unfortunately, unlike polypeptides and proteins, the fragmentation patterns for other classes of compounds of interest cannot be readily predicted. Therefore, as one approach to address this issue, databases, such as "mzCloud" (www.mzCloud.org) and "METLIN", of mass spectra of known compounds have been and continue to be developed. Accordingly, provided that the required information is available in a database of this sort, a researcher or analyst can hypothetically identify an analyte by recognizing a match between an experimental measurement of the fragmentation pattern of the analyte and a database entry.

The group of mass spectrometry analysis techniques that are collectively known as "data-independent acquisition" or "data-independent analysis" (DIA) were developed in an attempt expand the number of analytes of complex multi-component samples that may identified and/or quantified by tandem mass spectrometric analysis of chromatographic eluates. Mass spectrometry methods that utilize DIA have grown in importance in recent years. The basic DIA scheme has been known since the original Venable experiment (Venable et al., "Automated approach for quantitative analysis of complex peptide mixtures from tandem mass spectra", Nature Methods, 2004, vol. 1 (1), pp. 1-7), in which a series of MS2 scans that span a precursor range are continuously acquired to interrogate a sample, which is commonly being introduced to a mass spectrometer from a liquid chromatography separation device.

Figure 1:
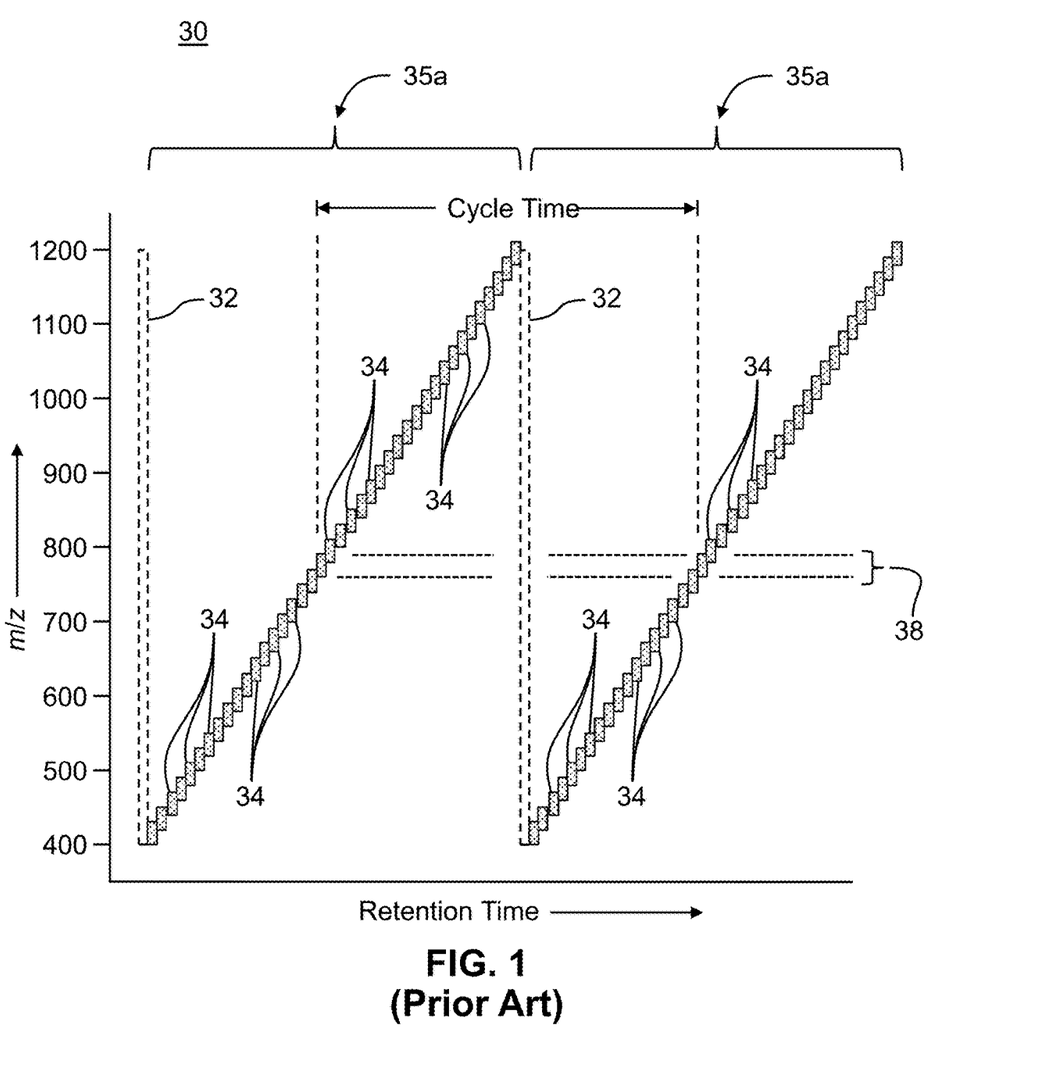
FIG. 1 is a schematic illustration of the sequencing and m/z ranges of a hypothetical series of fragment mass spectra and optional survey mass spectra as may be obtained during a conventional data-independent mass spectral analysis of chromatographically eluting analytes.

FIG. 1 is a highly schematic diagram, shown generally at 30, illustrating the general sequence of events that may occur during a hypothetical LCMS analysis performed according to one data-independent acquisition method known as "SWATH MS" (Gillet et al., Targeted Data Extraction of the MS/MS Spectra Generated by Data-independent Acquisition: A New Concept for Consistent and Accurate Proteome Analysis, Mol. Cell. Proteomics, 2012, 11(6): O111.016717. DOI: 10.1074/mcp.O111.016717) and often used in conjunction with SWATH™ quantitative proteomics software. In FIG. 1, m/z values of precursor ions or first-generation ions are represented as ordinate values and chromatographic retention time values are represented as abscissa values. The SWATH MS data-independent procedure includes consecutively acquiring a series of high-resolution, accurate-mass fragment-ion spectra during an entire chromatographic elution range (retention time range) by repeatedly stepping through a number (for example thirty two) discrete precursor-ion isolation windows of a certain window width (for example, 25 Da width) across a full mass spectral range of interest (for example, the 400-1200 m/z range). Thus, a main feature of the technique, as illustrated in FIG. 1, is a plurality of series of consecutive product-ion analyses 34. Each such product ion analysis 34 is represented as a shaded box and includes the steps of: isolation of precursor ions within a restricted range of m/z values, fragmentation of the isolated precursor ions so as to generate fragment ions and mass analysis of the fragment ions generated from the isolated precursor ions (i.e., a fragmentation scan). Each restricted range of precursor m/z values may be termed an "isolation window" (or, equivalently, an "isolation range", an "isolated range" or an "isolation bin"). The width of the isolation windows (height of the boxes 34 in FIG. 1), as employed in the known SWATH MS technique, is typically significantly greater than the widths of isolation windows employed in standard targeted MS2 methods. For example, the isolation ranges represented by the first several boxes 34, beginning at the lower left position, of FIG. 1 are 400-430 Da, 420-450 Da, 440-470 Da, 460-490 Da, 480-510 Da, etc. It should be noted that the product ions, themselves, that are generated by fragmentation of set of precursor ions may comprise a different range of product-ion m/z values (not specifically indicated by any box).

Two series, 35a and 35b, of product-ion analyses are illustrated in FIG. 1. Consecutive isolation windows (corresponding to consecutive product-ion analyses) partially overlap one another in m/z to assure that there are no m/z gaps within which m/z positions of unfragmented first-generation ions occur. Once the series of isolation windows has covered the full m/z range of interest (i.e., once an end of the full m/z range of interest has been reached), then a new series of consecutive product-ion analyses is investigated in similar fashion starting at the opposite end of the range. As used herein, the term "cycle time" is the time required to return to the acquisition of any given precursor isolation window. The boxes 32 outlined with dashed lines at the beginning of each cycle depict optional acquisition of a high-resolution, accurate mass survey scan of precursor ions throughout the full m/z range of interest. The totality of data product-ion analyses 34 corresponding to any given precursor mass range across the range of retention times is oftentimes referred to as a "swath". One such swath is shown at 38 in FIG. 1.

After the collection of mass spectral data as depicted in FIG. 1, certain targeted compounds may be recognized by mathematical processing of the data, in which comparisons and attempted matches are made to tabulated entries in mass spectral libraries or databases. Such libraries and databases may include previously determined reference spectra of known compounds and may include information such as the m/z positions and relative intensities of mass spectral lines as well as chromatographic retention times and other associated information. In accordance with known DIA methods, patterns of correlated fragment-ion m/z positions, relative intensities and elution profiles are matched to the reference information to recognize patterns of signals that can uniquely identify the targeted compound or compounds.

The DIA methods are highly regarded for their reproducibility, since m/z coverage is complete within a range of interest and there is no requirement to make data-dependent decisions in real-time. Thus, longitudinal experiments that compare large numbers of samples are possible, without the possibility of missing m/z values. The DIA technique is also regarded for its simplicity—whereas targeted MS2 experiments may require the user to determine the retention time of each compound in an experiment to maximize instrument resources, the user needs to know considerably less about the sample to be able to perform a DIA experiment. Nominally, the user only needs to know the precursor m/z range to be interrogated and the typical LC peak width, which will determine the isolation width that can be used to cover the range in a given amount of time. For example, if six data points are required to characterize the elution of a compound from liquid chromatograph, and if the LC peak is six seconds wide, than the cycle time to characterize the precursor range is one second, and the size of the scan range and the speed of the mass spectrometer will dictate what isolation width can be used.

The DIA methods are also regarded for their multiplexing capability. Nonetheless, this important feature of data-independent analysis is also its principal weakness. Traditionally, DIA experiments have needed to use wide m/z isolation windows (also known as "bins") to be able to scan a given range of precursor-ion m/z in a reasonable amount of time. By using large isolation widths, it is possible transmit and fragment multiple precursors at once. However, the complexity of the resulting multiplexed MS2 spectra can cause difficulties for the assignment of fragment ions to their corresponding precursors. Therefore, the optimization of the isolation width is of importance to maximize the usefulness of the DIA data. To this end, Bonner and Tate (U.S. Pre-Grant Publ. No. 2016/0079047) describe a method for using variable isolation widths as a function of the density of the compounds (in m/z space) that the user expects to analyze or to be otherwise present in the sample. The Bonner and Tate method relies on knowledge of the probability density of compound mass-to-charge values in a sample. While, in many cases, it is possible to determine this distribution, it could be more useful to have a method that only depends on the compounds that a user intends to analyze, and not on the nature of the additional species that are found in the sample matrix background. Additionally, the Bonner and Tate method uses larger isolations for precursors with low compound density, which doesn't necessarily mean that interference between transitions of different precursors is precluded. Accordingly, there remains a need in the art for improving the efficiency of DIA mass spectral analyses.

SUMMARY

Against the above-described background, the present inventor considers that it is possible, in some cases, to improve on the conventional DIA techniques that are described above. Any DIA experiment is dependent on comparisons of MS2 spectra against a spectral library, be it generated in silico or experimentally. Therefore, the feasible space of possible compounds to be analyzed is generally known. In many cases, researchers are interested in a subset or certain class of compounds. Narrowing the feasible compound space can be exploited to reduce the number of acquired mass spectra needed to interrogate the compounds, allowing smaller isolation widths to be used and increasing data quality.

Methods for performing data independent acquisition are herein disclosed that decrease the number of acquisitions required to characterize a set of compounds, while maintaining a fixed isolation width. According to some embodiments, a determination is made of the full set of m/z bins that are required to analyze the complete precursor range of the compounds at a particular isolation width. However, according to various embodiments, only those bins that are known to contain one or more compounds of interest are included in the MS2 experiment. Mass regions with sparse precursor density are analyzed more efficiently than using the conventional approach (herein referred to as the "naïve" approach, as it makes no assumptions regarding the number and m/z distribution of analytes of interest), which would include acquisitions in mass regions where no expected compounds exist. Mass regions with sparse precursor ion density may be isolated using very narrow precursor-ion isolation windows, such as isolation windows having widths within the range of 1-4 Th.

Accordingly, in a first aspect of the present teachings, there is provided a method of data-independent mass spectrometric analysis of compounds of a compound class of interest, comprising:

determining or retrieving a distribution, over a mass-to-charge (m/z) ratio range of interest, of a number of primary ion species of members of said compound class having m/z ratios within each respective one of a plurality of m/z sub-ranges of the m/z ratio range of interest;

defining m/z positions of a set consisting of a number, $n_{sb}$, of finite-width bins, within the m/z ratio range of interest, the set of bins excluding m/z sub-ranges within the m/z ratio range of interest that encompass fewer than a threshold number, $t_{sb}$, of the primary ion species, wherein the defining is based on the determined or received distribution; and performing one or more cycles of tandem mass spectral analyses of compounds of the class, wherein each cycle of tandem mass spectral analyses comprises a plurality of tandem mass analyses, each tandem mass analysis of each cycle pertaining to primary ion species within a respective one of the defined bins.

In a second aspect of the present teachings a mass spectrometer system is provided, the mass spectrometer system comprising:

an ion source configured to receive portions of a sample comprising compounds that are members of a compound class of interest;

a mass filter configured to receive primary ion species generated by the ion source, the generated ions comprising a mass-to-charge (m/z) ratio range of interest;

an ion fragmentation cell configured to receive a plurality isolated subsets of the primary ion species from the mass filter;

a mass analyzer configured to receive, from the fragmentation cell, product ions generated by fragmentation of the isolated subsets of the primary ion species;

a detector configured to detect ions outlet from the mass analyzer; and one or more programmable processors electrically coupled to the mass filter, the ion fragmentation cell, the mass analyzer and the detector and comprising computer-readable instructions adapted to:

retrieve, from a database, a distribution, over the m/z ratio range of interest, of a number of primary ion species of members of said compound class having m/z ratios within each respective one of a plurality of sub-ranges of the m/z range of interest;

define m/z positions of a set consisting of a number, $n_{sb}$, of finite-width bins within the m/z ratio range of interest, the set of bins excluding m/z sub-ranges within the m/z ratio range of interest that encompass fewer than a threshold number, $t_{sb}$, of the primary ion species, wherein the defining is based on the retrieved distribution; and cause the mass filter, ion fragmentation cell and mass analyzer to perform one or more cycles of tandem mass spectral analyses of compounds of the class, wherein each cycle of tandem mass spectral analyses comprises a plurality of tandem mass analyses, each tandem mass analysis of each cycle pertaining to primary ion species within a respective one of the defined bins.

BRIEF DESCRIPTION OF THE DRAWINGS

The above noted and various other aspects of the present invention will become apparent from the following description which is given by way of example only and with reference to the accompanying drawings, not necessarily drawn to scale, in which.

DETAILED DESCRIPTION

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features of the present invention in greater detail, please refer to FIGS. 2, 3, 4A, 4B, 5A, 5B, 6 and 7 in conjunction with the following description.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that, for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise.

As used in this document, the terms "scan", "mass scan" and "mass analyze", when used are verbs, are used interchangeably to denote the operation of a mass analyzer portion of a mass spectrometer in performing its general function of identifying and reporting the m/z values of ion species and the relative quantities of those ion species within any collection of ion species. The terms "scan", "mass scan" and "mass analysis", used are nouns, are used interchangeably to denote the results of such operation. In this document, the terms "scan" and "mass scan" are not intended to be limited to the operation of and data results produced by scanning-type mass analyzers; instead, these terms are intended to apply to the operation of and data produced by any type of mass analyzer. As used in this document, the terms "primary ions" and "primary ion species" are used to denote ions and ion species, respectively, that are generated within a mass spectrometer ion source, prior to any further intentional modification, such as intentional fragmentation or other reaction with surfaces, molecules or reagent ions. According to these definitions, primary ions and primary ion species may include unintentional or unavoidable fragmentation within an ion source or within ion transfer components.

As used in this document, the term "class" refers to any set of compounds that a mass spectrometry analyst wishes to detect and/or quantify simultaneously (within a single set of mass spectrometry analyses of a sample), either because of their chemical similarity to one another, because of an expectation of their simultaneous occurrence (such as contaminants) within one or more individual samples, because of their ability to predict or diagnose medical conditions, or because of their ability to present a health or safety hazard when found to be present in certain environments. Frequently, such compounds are synthesized industrial chemicals or metabolite compounds that comprise small molecules for which chromatographic retention time data and retention-time prediction tools are either sparse, are unreliable or are unavailable. Although such compounds may be separated—one from another—using chromatographic techniques, the sparsity of chromatographic data may require continuous analysis for all such compounds throughout a chromatographic separation.

Figure 2:
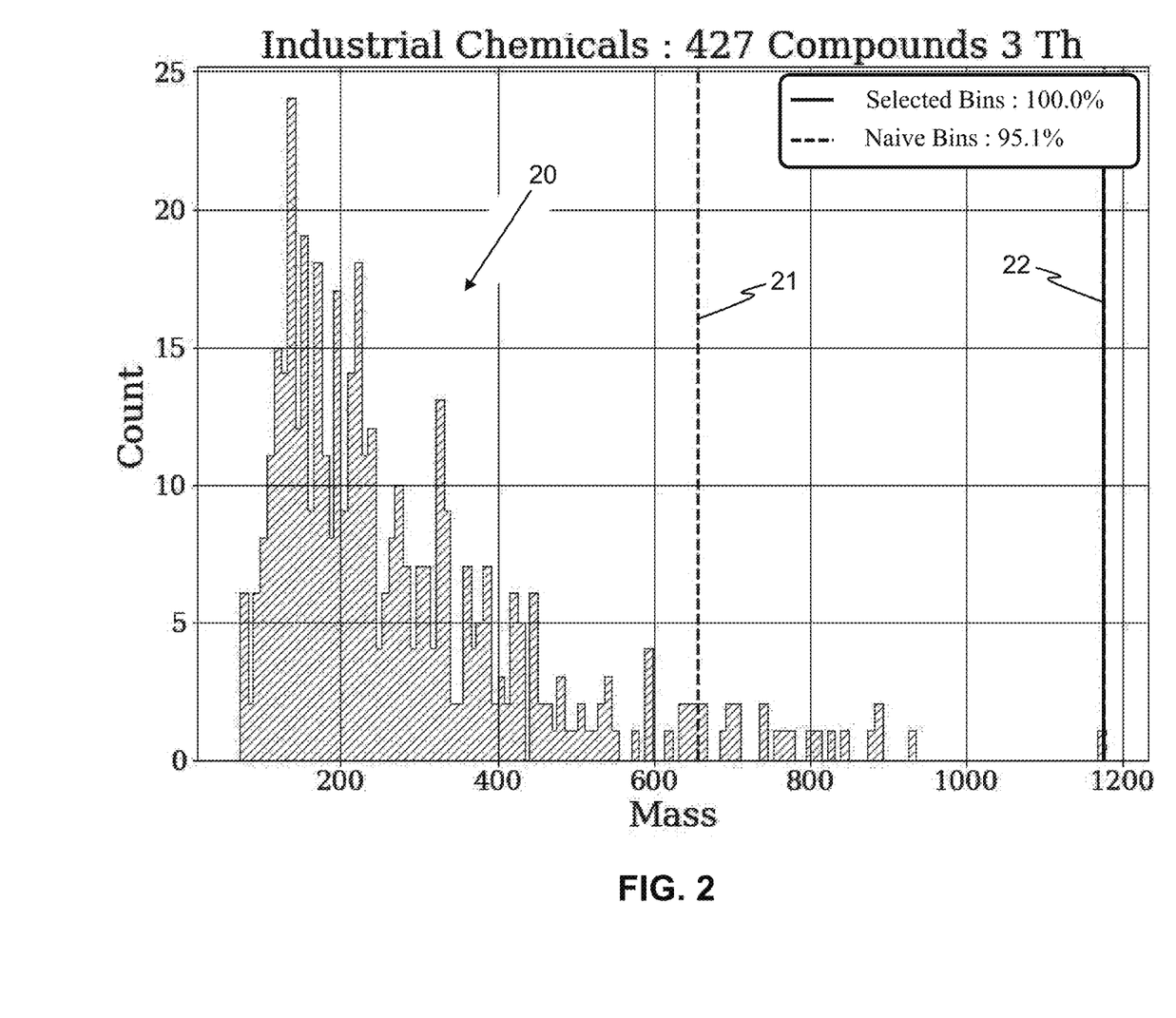
FIG. 2 is a histogram of the distribution, across mass-to-charge (m/z) values, of compounds of the Industrial Chemicals class, as tabulated in the mzCloud database.

Consider a case where a user is interested in analyzing compounds labeled as belonging to the Industrial Chemicals (as tabulated in the mzCloud database), as shown in FIG. 2. In this case, the entire class consists of 427 compounds, with a minimum m/z of 72 Th, and maximum m/z of 1172 Th. To interrogate the entire range of compounds with a 3 Th isolation width would require (1172−72)/3=367separate bins, each bin corresponding to a respective one of 367 separate data acquisition procedures, each data acquisition procedure including: (1) isolating primary ion species having m/z values within the bin; (2) fragmenting the isolated primary ion species to generate a set of product ions, and (3) mass analyzing the product ions within a predetermined product-ion m/z range. Given a generally desired LC condition in which the cycle time (i.e., the time available to perform all 367 data acquisitions) is not greater than one second, a mass spectrometer analysis repetition rate of 367 Hz is required. However, for analyses of the type described, conventional mass spectrometers can generally achieve analysis repetition rates in the range of less than 100 up to approximately 200 Hz. The analysis repetition rates of hybrid mass spectrometers that include electrostatic traps are even less. Faced with this dilemma, a user would need to make a compromise, in the naïve bin-definition case, of either increasing the isolation width (window or bin width) or else foregoing analysis of compounds that yield primary ion species with m/z greater than approximately 650 Th (dashed vertical line 21).

Figure 3:
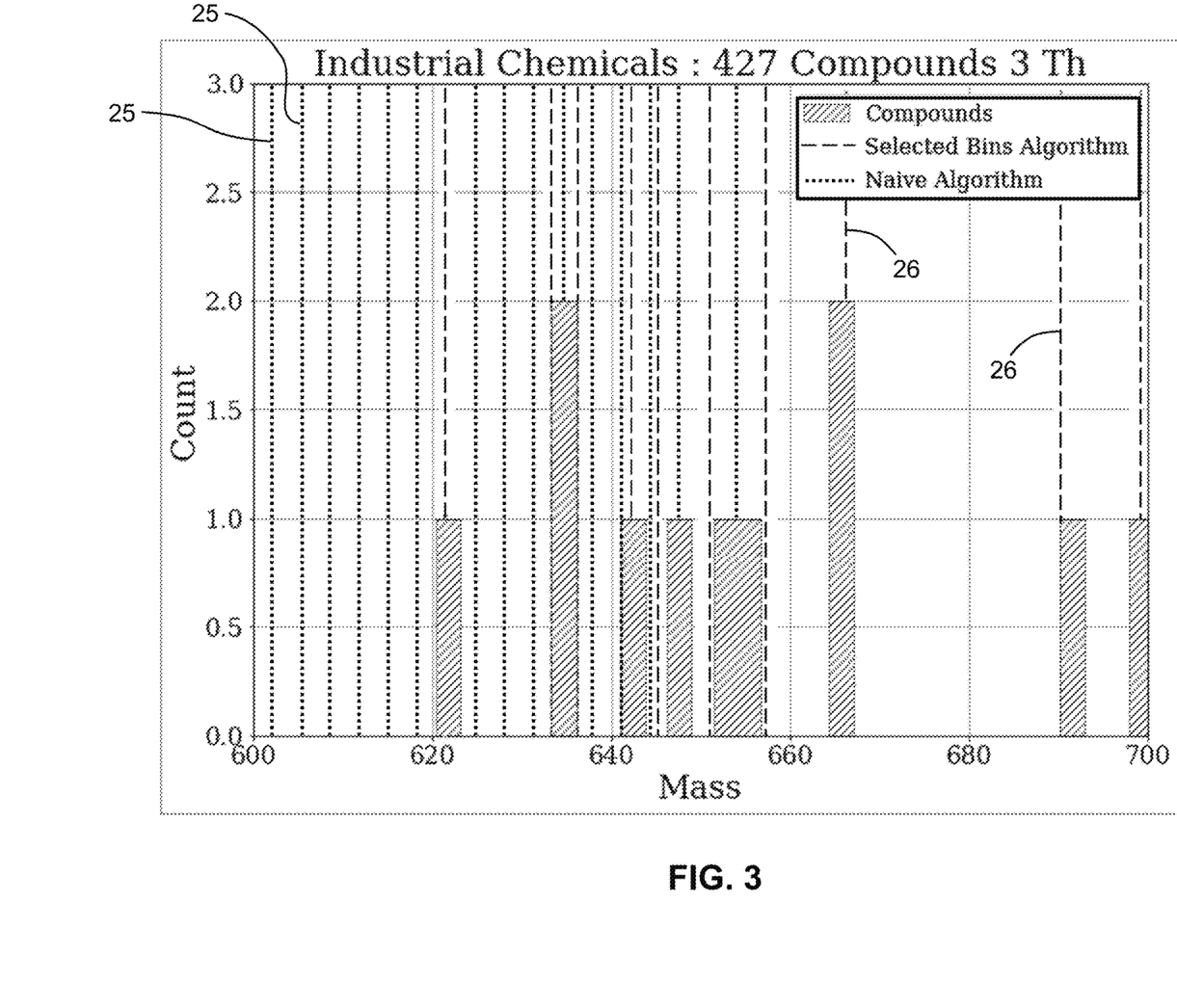
FIG. 3 is an illustration of mass bins, within the 600 Th to 700 Th of the Industrial Chemicals class of compounds, that correspond to tandem mass spectral (MS2) analyses that are required for the conventional mass spectral data-independent analysis (DIA) method and for the herein-described Selected Bins DIA method.

According to the present teachings, a simple solution to the problem illustrated in FIG. 2 is to divide the precursor m/z range up into its component scans or mass bins, as one does in a normal DIA experiment, but to not perform the scans for any bin within which no known m/z values corresponding to precursor ions of the compound class. FIG. 3 is an expanded view of the sparsely-populated 600 Th to 700 Th region of MS1 spectra of the Industrial Chemicals class of compounds. Vertical dotted lines 25 in FIG. 3 represent the centers of ion isolation bins as would be determined using conventional, naïve bin definition. Note that, using the above assumptions of 3 Th bin width and a maximum available cycle time of one second, these naïve bins do not extend to m/z values greater than approximately 650 Th (dashed vertical line 21 in FIG. 3). In contrast, the vertical dashed lines 26 in FIG. 3 represent the centers of isolation windows that are chosen in accordance with the present teachings. Note that, unlike the conventionally defined bin locations these latter isolation windows are not necessarily contiguous. Instead, the positions of the m/z isolation windows are chosen so as encompass only m/z regions that include m/z values of diagnostic interest for the compound class being investigated, as determined by the distribution of m/z values of primary ion species of the compounds (represented by histograms in FIGS. 2, 3, 4A and 4B. Accordingly, the number of isolation bins chosen in accordance with the present teachings is far fewer than the number of naïve bins. In the case of the Industrial Chemicals class, this reduces the number of scans required to analyze 100% of the compounds from 367 to 155 and an increase of approximately five percent in the number of compounds that may be interrogated (i.e., compounds that yield primary ion species having m/z values greater than 650 Th), relative to the conventional naïve bin definition method using bins that are 3 Th wide. The user could decide to trade this new-found efficiency for a smaller isolation width, or alternatively could reduce the experiment time and LC peak widths (for example, by adjustment of a chromatographic gradient elution) to realize an increase in throughput. For brevity, the isolation bin selection procedure as taught herein is referred to as the "Selected Bins" method.

Figure 4A:
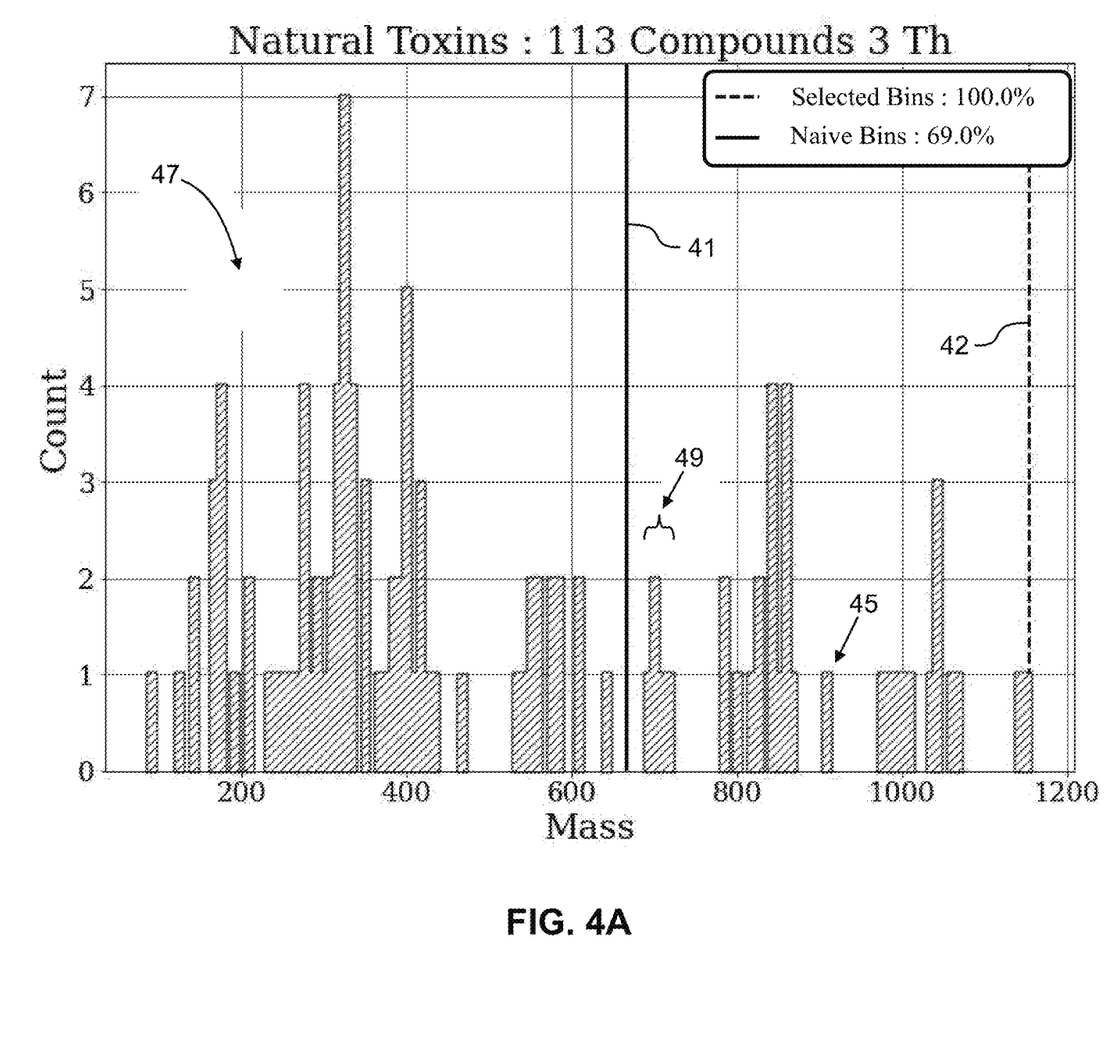
FIG. 4A is a histogram of the distribution, across m/z values, of compounds of the Natural Toxins class, as tabulated in the mzCloud database, showing a comparison between the number of compounds of the class that can be analyzed in one second with a 3 Th isolation width using a conventional DIA bin selection method and the number of compounds of the class that can be analyzed under the same experimental constraints the herein-described Selected Bins DIA method.
Figure 4B:
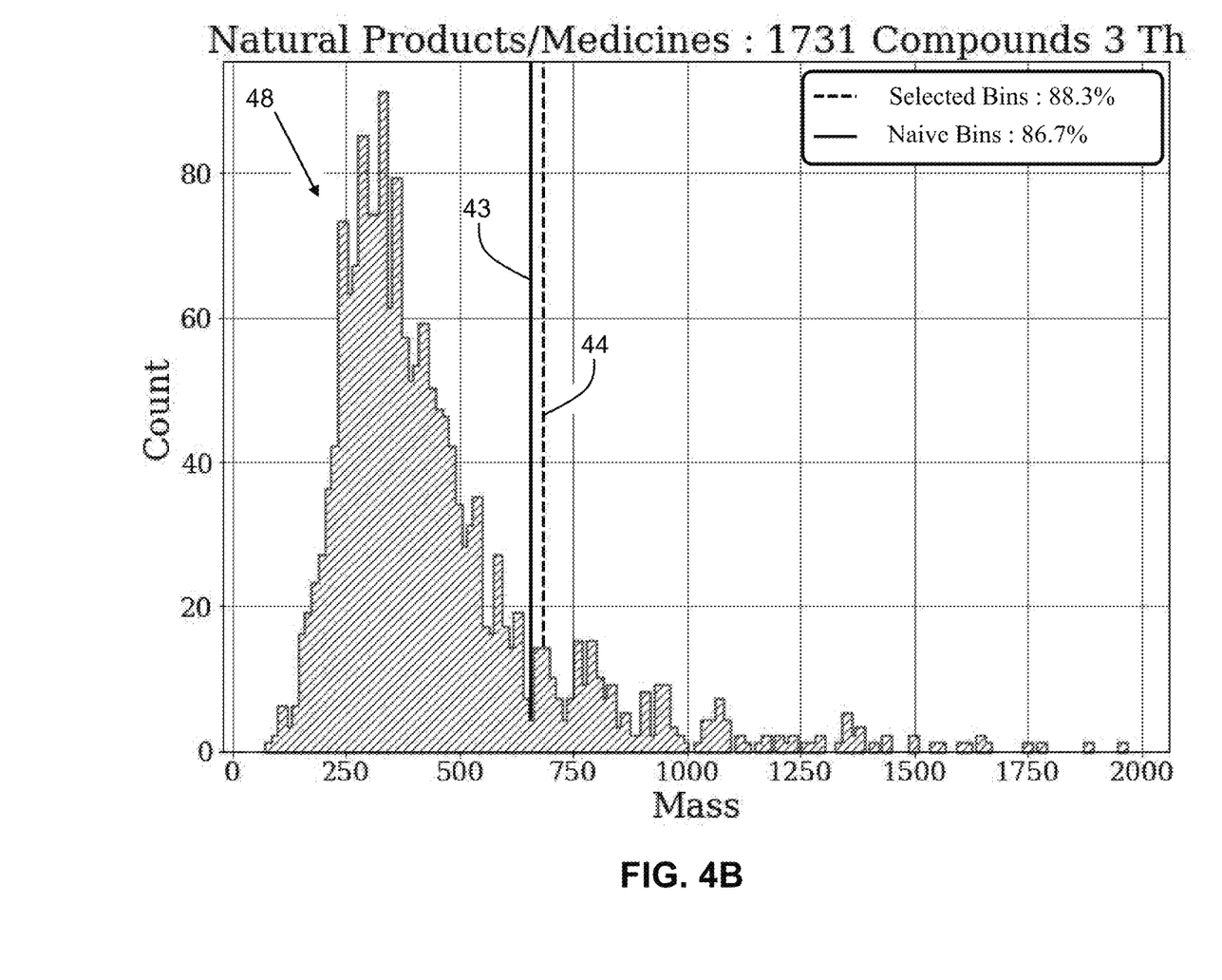
FIG. 4B is a histogram of the distribution, across m/z values, of compounds of the Natural Products/Medicines class, as tabulated in the mzCloud database, showing a comparison between the number of compounds of the class that can be analyzed in one second with a 3 Th isolation width using a conventional DIA bin selection method and the number of compounds of the class that can be analyzed under the same experimental constraints the herein-described Selected Bins DIA method.

FIGS. 4A-4B illustrate, respectively, the greatest and least efficiency improvements, relative to conventional DIA methods, that may be achieved by the herein-described Selected Bins method during DIA analyses of classes tabulated in the mzCloud database. FIG. 4A shows the distribution of m/z values of characteristic primary (precursor) ions of compounds within the Natural Toxins class, as defined in the mzCloud database. Because the precursor-ion m/z values of compounds of this class are sparsely distributed across a wide range, the naïve DIA method wastes many scans in mass regions where no members of this compound set are found. Thus, whereas employment of the Selected Bins DIA method is able to provide diagnostic data of all members of the class, as represented by the dashed vertical line 42, the naïve DIA method can only achieve 69% coverage of the compounds (solid line 41), using 3 Th bin widths. As a contrasting example, the Natural Products/Medicines class (FIG. 4B) has a very dense and broad precursor mass distribution, and there is essentially no difference in the efficiency of the Selected Bins method relative to naïve DIA methods.

Figure 5A:
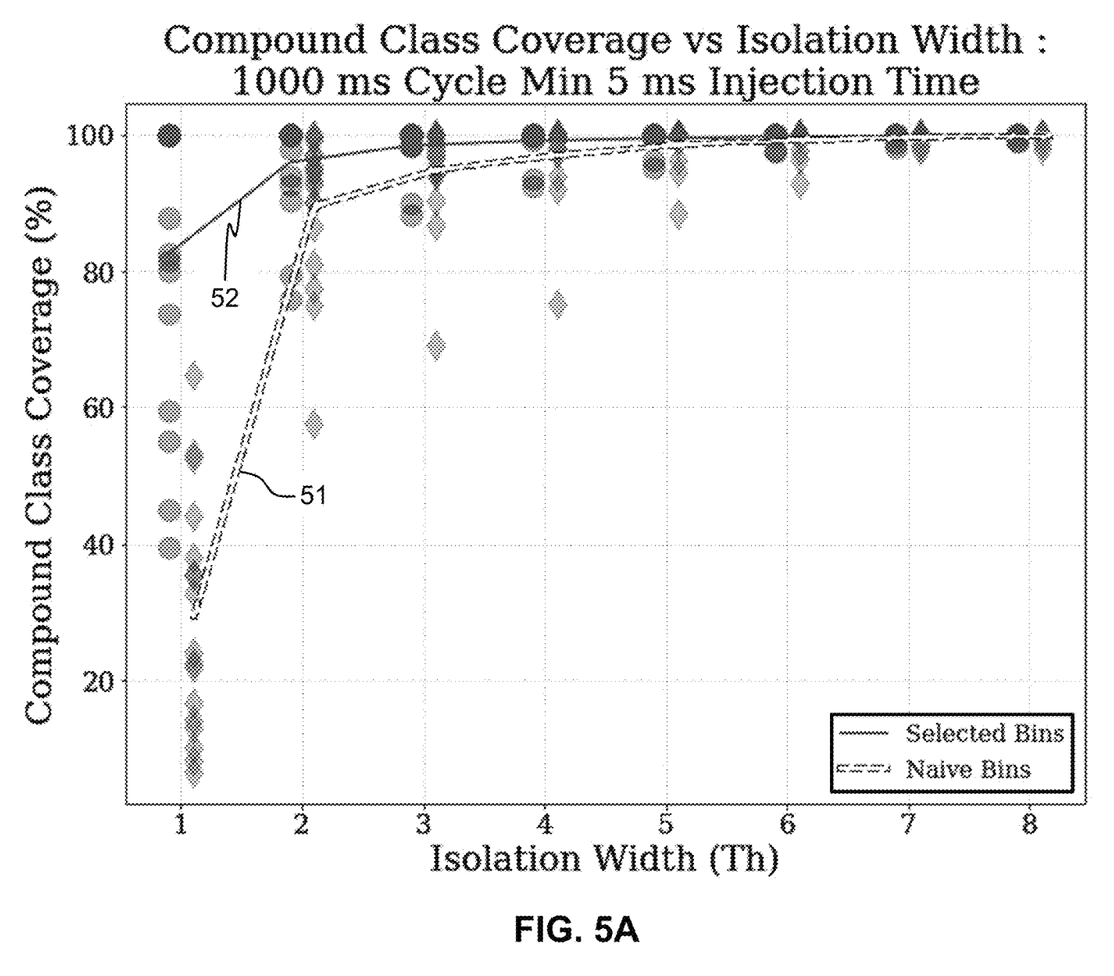
FIG. 5A is a plot of achievable percentage of class coverage versus mass spectral isolation width (in thomsons) for multiple compound classes as tabulated in the mzCloud database, where class coverage is defined as the number of compounds of a class that can be analyzed divided by the total number of compounds in the class, using the methods of the present teachings with the various isolation width values and a fixed cycle time of 1000 ms.
Figure 5B:
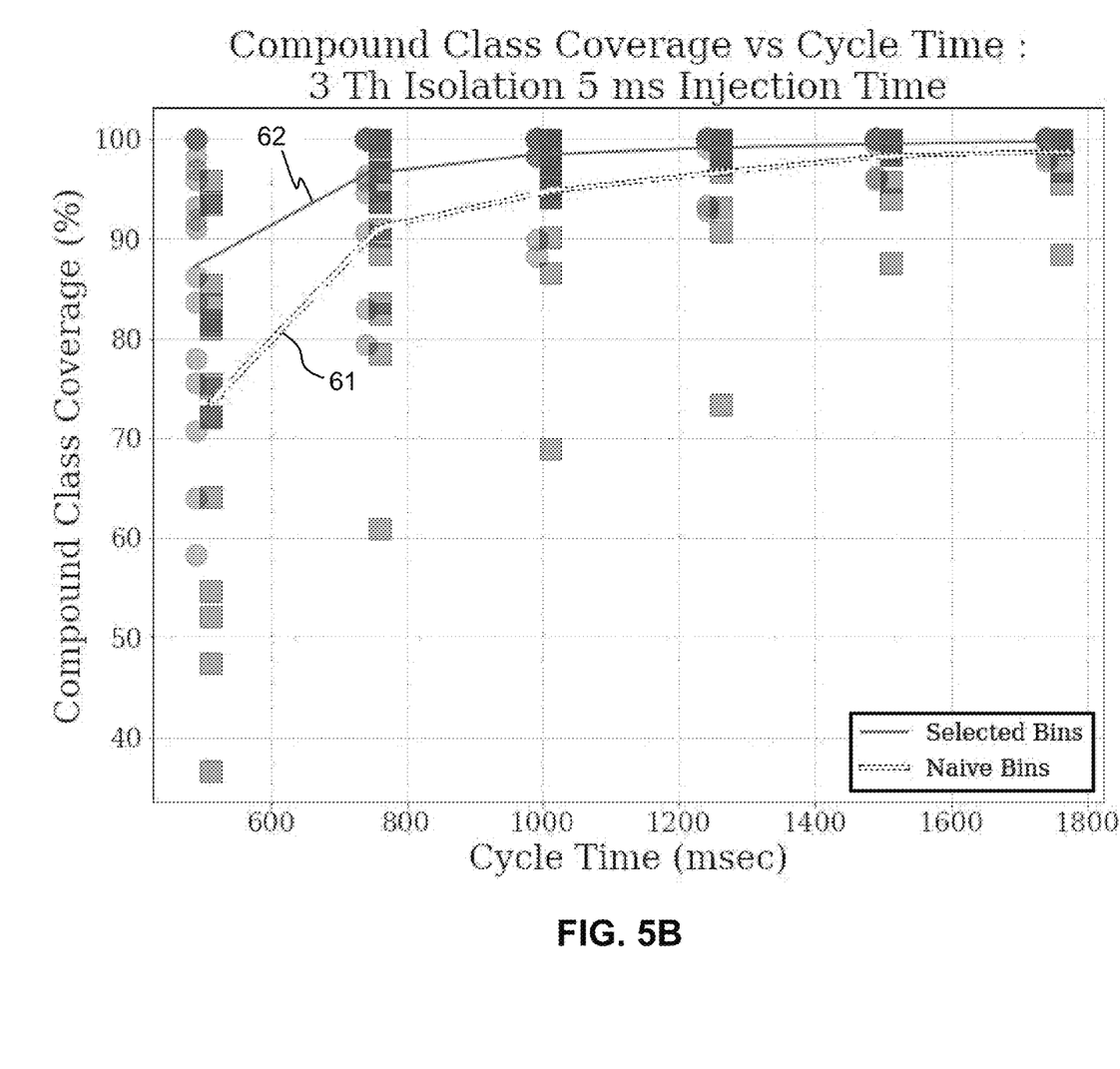
FIG. 5B is a plot of achievable class coverage versus cycle time (in msec) for multiple compound classes as tabulated in the mzCloud database using the methods of the present teachings with various cycle-time values and a fixed isolation width of 3 Th.

In order to further investigate the utility of the herein-described novel Selected Bins method, a study was made of the m/z distributions of 17 different compound classes, containing from 31 up to 10000 compounds per class, from the mzCloud database. The various investigated classes are listed below in Table 1. The study included determinations of the fraction of the compounds in each class that could be analyzed with given cycle times and isolation widths. In FIGS. 5A, 5B, plotted symbol represents class coverage as the number of compounds of a class that can be analyzed with the given conditions as noted in the figure, divided by the total number of compounds in the class. Plotted diamonds (FIG. 5A and regression line 51) and squares (FIG. 5B and regression line 61) represent theoretical class coverage using a conventional DIA procedure that includes naïve definition of isolation bins. Plotted circles and regression lines 52 and 62 in FIGS. 5A-5B represent theoretical class coverage using Selected Bins DIA procedure taught herein.

TABLE 1

| CLASS | # COMPOUNDS | m/z RANGE |
| --- | --- | --- |
| Endogenous Metabolites | 3062 | 60.0-1964.9 |
| Therapeutics/Prescription Drugs | 1352 | 60.0-1421.7 |
| Industrial Chemicals | 427 | 72.0-1176.8 |
| No Compound Class Specified | 11254 | 74.1-1556.7 |
| Natural Products/Medicines | 1731 | 75.0-1964.9 |
| Extractables/Leachables | 532 | 72.0-1060.3 |
| Textile Chemicals/Auxiliary/Dyes | 270 | 72.0-748.2 |
| Pesticides/Herbicides | 746 | 60.0-913.5 |
| Drugs of Abuse/Illegal Drugs | 1191 | 99.1-632.5 |
| Personal Care Products/Cosmetics | 194 | 60.0-804.4 |
| Excipients/Additives/Colorants | 260 | 60.0-972.3 |
| Steroids/Vitamins/Hormones | 31 | 176.0-776.7 |
| Sports Doping Drugs | 846 | 114.0-802.4 |
| Natural Toxins | 113 | 88.1-1156.5 |
| Counterfeit Drug (Therapeutic) | 72 | 182.1-554.3 |
| Illegal Additives | 60 | 101.1-554.3 |
| Perfluorinated Hydrocarbons | 40 | 180.0-913.9 |

In a first investigation (FIG. 5A), the cycle time was held constant at one second while the isolation width was varied. As isolation width increases, fewer scans are required to analyze the compounds, and the limit of complete class characterization within the cycle time is reached. It is worthy of note that the difference between the methods is greatest at small isolation widths, which are the most advantageous from the standpoint of data quality. For example, with 1 Th isolation width, the mean class coverage for the Selected Bins method is 82%, while the naïve method has a mean class coverage of 29%. In a second investigation, the isolation width was held constant at 3 Th while the cycle time was varied, a situation that experimentally corresponds to an increase in LC peak width and a longer experiment time. Here again, complete class coverage is realized by both DIA methods at the limit of long cycle times, while the largest increase in class coverage between methods is found at the shortest cycle times, which are most desirable from an experimental throughput perspective. For example, with a 500-millisecond cycle time, the Selected Bins method gives 87% mean class coverage, while the naïve method gives 73% mean class coverage.

Figure 6:
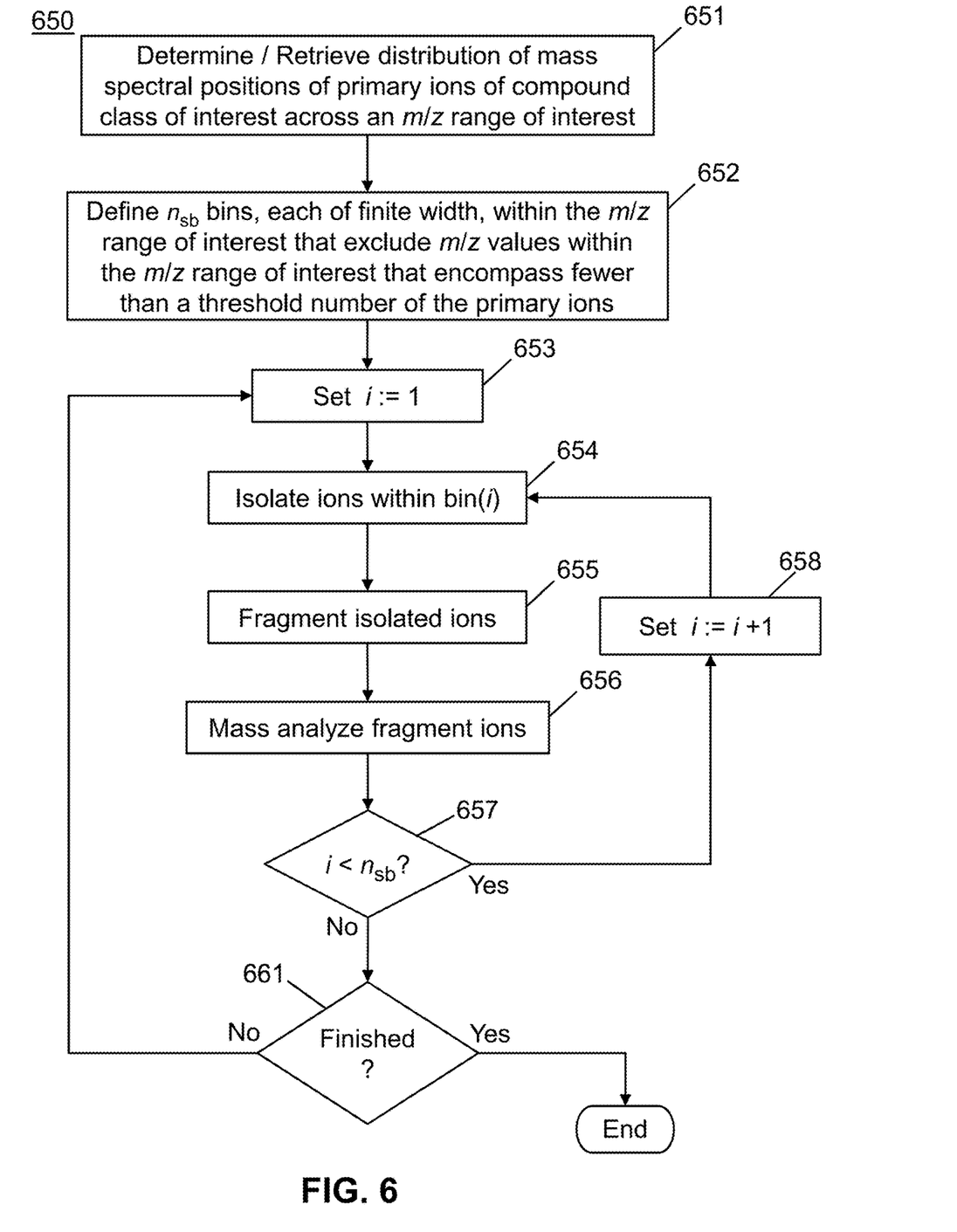
FIG. 6 is a flow diagram of a method for performing data-independent mass spectral analysis in accordance with a method of the present teachings.

FIG. 6 is a flow diagram of a method for performing data-independent mass spectral analysis in accordance with a method of the present teachings, the method employing selection of isolation bins as taught herein. In step 651 of the method 650, a distribution of the mass spectral positions (i.e., the m/z values) of primary ion species of a compound class of interest is either retrieved (as from a database or other tabulation of m/z values) or else experimentally determined. In some instances, an experimental determination may be made prior—perhaps immediately prior—to the execution of the method 650 using the same mass spectrometric system. In some other instances, the information may be input by a user or may be retrieved from a database or other electronic file. The determined or retrieved distribution of values may generally be formulated or represented as a histogram, such as the histograms 20 (FIGS. 2-3), 47 (FIG. 4A) and 48 (FIG. 4B) which pertain, respectively, to the industrial chemicals, natural toxins and natural products and medicines classes, as tabulated in the mzCloud database. Such distributions will generally be limited to or restricted to a certain interesting or diagnostic m/z range such as, for example, a measurement range of a mass spectrometer. In some instances, the step 651 may include the retrieval of additional information relating to the sample or to the analysis, such as fragmentation conditions to which the information pertains.

In step 652 of the method 650, the m/z distribution information that was determined or retrieved in step 651 is used to define a total number, $n_{sb}$, of bins, each of finite width, within the m/z range of interest, where the set of defined bins excludes m/z values within the m/z range of interest that encompass fewer than a threshold integer number, $t_{sb}$, of the m/z values of the primary ion species of the compound class of interest. Accordingly, the set of bins is defined such that there are gaps, within the general m/z range of interest, that are not within any bin. Each defined bin corresponds to a respective "isolation window" that comprises a restricted subset of m/z values within the m/z range of interest that will subsequently be co-isolated (in step 654) and simultaneously fragmented (in step 655). In many instances, the threshold, $t_{sb}$, is set to unity (i.e., $t_{sb}=1$) so that the gaps between bins correspond to m/z regions that are absent of any mass spectral lines of the primary ion species of the compound class of interest. Nonetheless, it is anticipated that, in some instances, the threshold value may be set to some integer that is greater than one, thereby causing each cycle of data-independent analyses (e.g, steps 653-658 of the method 650) to be preferentially directed to m/z regions having a high density of compounds of the particular class of interest, while possibly bypassing analyses of low-compound-density regions. In many instances, the number, $n_{sb}$, of bins may be determined by dividing a known or estimated length of time, $t_e$, that is available for conducting a series of tandem mass spectral analyses (e.g., an individual cycle of tandem mass analyses, such as one of the cycles 35a, 35b shown in FIG. 1) by the tandem-mass-analysis repetition rate, $r_e$, of the mass spectrometer instrument that is conducting the analyses. For example, if the mass spectrometer receives chromatographically separated fractions of a sample containing the compounds, then time, $t_e$, may correspond to the known or anticipated width of chromatographic elution peaks.

The $n_{sb}$ bins that are defined in step 652 of the method 650 be indexed by an index variable, i ($1 \leq i \leq n_{sb}$), with bin(1) encompassing the smallest m/z values that are analyzed during execution of the method 650 and bin($n_{sb}$) encompassing the greatest m/z values that are analyzed during execution of the method 650. According the manner by which the bins are defined in step 652, there is necessarily at least one m/z gap between a pair of consecutively-indexed bins and, in fact, there may be many such gaps. This analysis strategy contrasts with known conventional data-independent-analysis techniques within which each and every m/z value within an analysis range of interest (or within an instrumentally constrained analysis range) is included within at least one defined bin (e.g., FIG. 1). The conventional DIA methods are well suited to situations in which there is little or no a priori information regarding the distribution, in m/z space, of the m/z values of potential compounds of interest. Lacking such information, the conventional DIA methods must proceed under the assumption that the distribution of m/z values of primary ion species of compounds of potential interest is uniform across an entire m/z range. Such an assumption is not usually true for DIA analyses of compounds of biologically derived samples. By inspection of the m/z distribution histograms of primary ion species of various small-molecule compound classes, such as the histograms 20 (FIG. 2), 47 (FIG. 4A) and 48 (FIG. 4B), it is evident that the distributions are not necessarily uniform. Accordingly, methods in accordance with the present teachings make use of this m/z distribution information by restricting tandem mass analyses to just the m/z regions in which all or most of the primary ion species of interest are expected to occur. By these methods, a lesser number, $n_{sb}$, of analysis bins are utilized than would be needed using conventional DIA analysis, thereby improving analytical efficiency.

The exact manner by which bin centers, $(m/z)_i$, and, optionally, bin widths, $W_i$, where $1 \leq i \leq n_{sb}$ are defined in step 652 of the method 650 may be in accordance with any one of a variety of procedures. For example, according to one simple procedure, an entire m/z range of interest (e.g., 100-1200 Th) may initially be divided into an initial number, $n_{initial}$, of identical bins, each of pre-determined width, $W_0$, with no intervening m/z gaps between any pair of adjacent bins. The set of initial bins may then be reduced to a final number, $n_{sb}$, of bins by simply discarding each and every bin that corresponds to an m/z range within which the number of primary ion species of compounds of the class of interest, as determined by the class histogram, is less than the threshold value, $t_{sb}$.

According to a different procedure, the centers of the bins may be defined to occur at the centers of individual isolated non-zero bars (e.g., isolated bar 45 of FIG. 4A) of the m/z distribution histogram of the compound class being analyzed or at the average m/z value of a cluster or an isolated cluster of histogram bars (e.g., the isolated cluster 49 depicted in FIG. 4A). As used here, a histogram "bar" refers to a collection of m/z values and/or the graphical depiction of the collection, wherein the maximum difference between any pair of m/z values of the collection is less than or equal to the binning increment, $\Delta(m/z)$, used during construction of the histogram. Also, as used here, the phrase "average m/z value of a cluster or an isolated cluster of histogram bars" can refer to either a mean m/z value, a median m/z value or a mode m/z value, depending on experimental requirements and the preferences of an analyst. If bins, so defined, comprise fewer than the threshold number, $t_{sb}$, of compounds of the class of interest that is being analyzed, then such bins may be discarded.

Regardless of which procedure is used to define bin positions, any bin may be discarded if the bin contains fewer than the threshold number, $t_{sb}$, of compounds of the class of interest. However, as an alternative to discarding bins that do not meet the threshold criterion, the m/z widths of the bins may be expanded so as to include more compounds of the class. In an opposite scenario, some defined bin positions may include a large number of compounds of the class that exceeds a desired maximum number, $c_{max}$, of compounds per bin. In such latter situations, some defined bins may be narrowed in width and/or sub-divided to reduce the number of compounds per bin to below the maximum.

Once the set of $n_{sb}$ bins has been defined in step 652, a data-independent analysis procedure proceeds as an iterated loop of steps 653-661 as shown in FIG. 6. Each iteration of the loop of steps 653-661 corresponds to a single series or cycle, 35a and 35b, of product-ion analyses 34 (FIG. 1). However, in contrast to the DIA analysis scheme depicted in FIG. 1, the method 650 incorporates one or more m/z gaps between the primary-ion isolation windows of consecutive product-ion analyses as noted above. Optionally, the widths of the various bins may not be uniform. The iterations of the loop of steps 653-657 continue until the analysis is completed (decision step 661) in accordance with a pre-arranged termination event, such as the completion of a gradient elution by a chromatograph that provides a stream of sample to a mass spectrometer that is employed during execution of the method.

The iterated loop of steps, 654-661 of the method 650 includes within itself a nested inner loop of steps, e.g., steps 654-658, each iteration of which corresponds to a single product-ion analysis 34. In preparation for executing the inner loop of steps, a bin index variable, i, is first set or reset to its initial value of one in step 653. Subsequently, during each iteration of the inner loop, a group of primary ion species corresponding to a respective one of the isolation bins (i.e., the bin that is indexed by the current value of the index variable) are isolated (step 654) using a mass filter or other ion isolation device. During each execution of the step 655, the ions isolated in the immediately prior step 654 are fragmented and a set of fragment ions are generated. Each set of fragment ions generated in step 655 is subsequently mass analyzed by a mass analyzer in an immediately following execution of step 656. The inner loop of steps is repeated until it is determined, in decision step 657, that the primary ion species of all defined $n_{sb}$ bins have been fragmented and isolated in this fashion. Otherwise, the bin index, i, is incremented in step 658 and execution of the method 650 returns to step 654.

Figure 7:
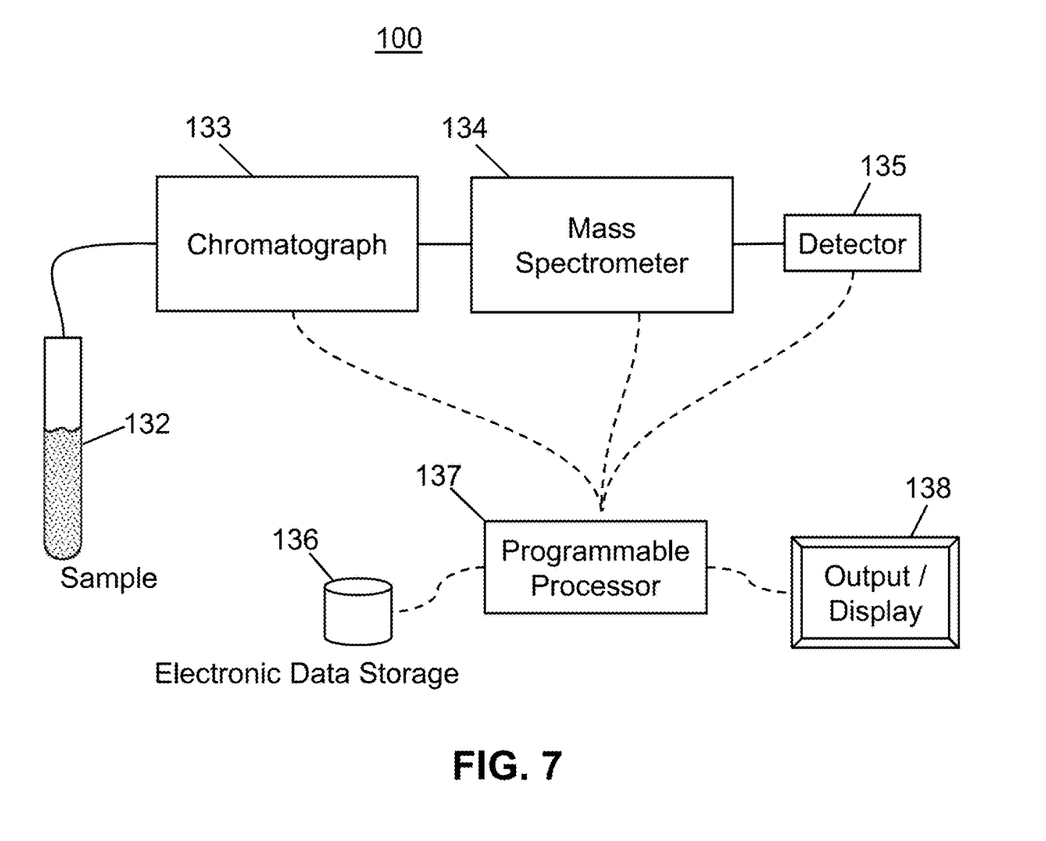
FIG. 7 is a schematic diagram of a system for generating and automatically analyzing chromatography/mass spectrometry spectra as may be employed in conjunction with methods of the present teachings.

FIG. 7 is a schematic diagram of a system 100 for generating and automatically analyzing chromatography/mass spectrometry spectra in accordance with the present teachings. A chromatograph 133, such as a liquid chromatograph, high-performance liquid chromatograph or ultra-high-performance liquid chromatograph receives a sample 132 of an analyte mixture and at least partially separates the analyte mixture into individual chemical components, in accordance with well-known chromatographic principles. The at least partially separated chemical components are transferred to a mass spectrometer 134 at different respective times for mass analysis. As each chemical component is received by the mass spectrometer, it is ionized by an ionization source of the mass spectrometer. The ionization source may produce a plurality of ions (i.e., a plurality of precursor ions) comprising differing charges or masses from each chemical component. Thus, a plurality of ions of differing mass-to-charge ratios may be produced for each chemical component, each such component eluting from the chromatograph at its own characteristic time. These various ions are analyzed and detected by the mass spectrometer together with its detector 135 and, as a result, appropriately identified according to their various mass-to-charge ratios. The mass spectrometer comprises a mass filtering apparatus (not shown) that isolates ion species within certain selected m/z ranges as well as a fragmentation cell (not shown) for generation of product ions by fragmentation of the selected ion species.

Still referring to FIG. 7, one or more programmable processors 137 of the system 100 is/are electronically coupled to the detector of the mass spectrometer and receives the data produced by the detector during chromatographic/mass spectrometric analysis of the sample(s). The programmable processor or processors may comprise a separate stand-alone computer or may simply comprise a circuit board or any other programmable logic device operated by either firmware or software. Optionally, the programmable processor may also be electronically coupled to the chromatograph and/or the mass spectrometer in order to transmit electronic control signals to one or the other of these instruments so as to control their operation. The nature of such control signals may possibly be determined in response to the data transmitted from the detector to the programmable processor or to the analysis of that data. The programmable processor may also be electronically coupled to a display or other output 138, for direct output of data or data analysis results to a user, or to electronic data storage 136.

The programmable processor or processors 137 of the system 100 shown in FIG. 7 may comprise computer-readable instructions that are generally operable to: (a) receive data relating to a distribution, as a function of mass-to-charge ratios (m/z) and across a range of m/z values, of peaks of primary ion species derived by ionization of compounds of a class of interest; (b) define a set of m/z bins based on the received distribution, whereby gaps exist, within the range of m/z values, that are not within any bin; and (c) cause the mass spectrometer 134 to conduct one or more cycles of tandem mass spectral analyses of compounds of the class, wherein each cycle of tandem mass spectral analyses comprises a plurality of tandem mass analyses, each tandem mass analysis of a cycle pertaining to primary ion species within a respective bin. The computer instructions may be operable to cause, during each tandem mass spectral analysis, the mass spectrometer to: isolate primary ion species of the respective bin; fragment the isolated primary ion species; and mass analyze fragment ions generated by the fragmenting of the isolated primary ion species.

Methods and apparatus for improving the efficiency of mass spectrometric data-independent analyses have been herein disclosed. The discussion included in this application is intended to serve as a basic description. The present invention is not intended to be limited in scope by the specific embodiments described herein, which are intended as single illustrations of individual aspects of the invention. Instead, the invention is limited only by the claims. Various other modifications of the invention, in addition to those shown and described herein will become apparent to those skilled in the art from the foregoing description and accompanying drawings. All such variations and functionally equivalent methods and components are considered to be within the scope of the invention. Any patents, patent applications, patent application publications or other literature mentioned herein are hereby incorporated by reference herein in their respective entirety as if fully set forth herein, except that, in the event of any conflict between the incorporated reference and the present specification, the language of the present specification will control.

What is claimed is:

1. A method of data-independent mass spectrometric analysis of compounds of a compound class of interest, comprising:
    determining or retrieving a distribution, over a mass-to-charge (m/z) ratio range of interest, of a number of primary ion species of members of said compound class having m/z ratios within each respective one of a plurality of m/z sub-ranges of the m/z ratio range of interest, wherein the determined or retrieved distribution comprises a histogram of a number of primary ion species versus m/z;
    defining m/z positions of a set consisting of a number, $n_{sb}$, of finite-width bins, within the m/z ratio range of interest, the set of bins excluding m/z sub-ranges within the m/z ratio range of interest that encompass fewer than a threshold number, $t_{sb}$, of the primary ion species, wherein the defining based on the determined or received distribution; and
    performing one or more cycles of tandem mass spectral analyses of compounds of the class, wherein each cycle of tandem mass spectral analyses comprises one or more tandem mass analyses pertaining to primary ion species within a respective one of the defined bins, each tandem mass analysis of each cycle pertaining to a respective primary ion species,
    wherein the defining of the m/z positions of the $n_{sb}$ finite-width bins comprises either defining a center of a bin within an m/z range encompassed by an isolated histogram bar or defining a center of a bin at an average m/z value of a cluster or an isolated cluster of histogram bars.

2. A method as recited in claim 1, wherein the defining of the m/z positions of the $n_{sb}$ finite-width bins comprises:
    dividing the m/z range of interest into $n_0$ equal width partitions that encompass the entire m/z range of interest, where $n_0 > n_{sb}$;
    discarding partitions that encompass fewer than $t_{sb}$ of the compounds; and
    defining each of the non-discarded partitions as a respective one of the finite-width bins.

3. A method as recited in claim 2, wherein $t_{sb}=1$.

4. A method as recited in claim 1, wherein $t_{sb}=1$.

5. A method as recited in claim 1, wherein the number, $n_{sb}$, of finite-width bins, is determined by dividing a known or estimated length of time, $t_e$, that is available for conducting a cycle of tandem mass spectral analyses by the tandem-mass-analysis repetition rate, $r_e$, of a mass spectrometer instrument that performs the tandem mass spectral analyses.

6. A method as recited in claim 5, wherein the estimated length of time, $t_e$, is a known or expected width of a chromatographic elution peak.

7. A method as recited in claim 1, further comprising defining a width, $\Delta(m/z)$ of at least one bin.

8. A method as recited in claim 7, wherein the defining of the width of the at least one bin comprises expanding the width of a bin to increase a number of m/z values of primary ion species of the compounds encompassed by the bin.

9. A method as recited in claim 7, wherein the defining of the width of the at least one bin comprises subdividing a bin so that a number of m/z values of primary ion species of the compounds encompassed by the bin is reduced to below a pre-determined maximum value, $c_{max}$.

10. A mass spectrometer system comprising:
an ion source configured to receive portions of a sample comprising compounds that are members of a compound class of interest;
a mass filter configured to receive primary ion species generated by the ion source, the generated ions comprising a mass-to-charge (m/z) ratio range of interest;
an ion fragmentation cell configured to receive a plurality of isolated subsets of the primary ion species from the mass filter;
a mass analyzer configured to receive, from the fragmentation cell, product ions generated by fragmentation of the isolated subsets of the primary ion species;
a detector configured to detect ions outlet from the mass analyzer; and
one or more programmable processors electrically coupled to the mass filter, the ion fragmentation cell, the mass analyzer and the detector and comprising computer-readable instructions adapted to:
 determine or retrieve, a distribution, over the m/z ratio range of interest, of a number of primary ion species of members of said compound class having m/z ratios within each respective one of a plurality of sub-ranges of the m/z range of interest, wherein the determined or retrieved distribution comprises a histogram of a number of primary ion species versus m/z;
 define m/z positions of a set consisting of a number, $n_{sb}$, of finite-width bins within the m/z ratio range of interest, the set of bins excluding m/z sub-ranges within the m/z ratio range of interest that encompass fewer than a threshold number, $t_{sb}$, of the primary ion species, wherein the defining is based on the retrieved distribution; and
 cause the mass filter, ion fragmentation cell and mass analyzer to perform one or more cycles of tandem mass spectral analyses of compounds of the class, wherein each cycle of tandem mass spectral analyses comprises one or more tandem mass analyses pertaining to primary ion species within a respective of the defined bins, each tandem mass analysis of each cycle pertaining to a respective primary ion species,
 wherein the defining of the m/z positions of the non finite-width bins comprises either defining a center of a bin within an m/z range encompassed by an isolated histogram bar or defining a center of a bin at an average m/z value of a cluster or an isolated cluster of histogram bars.

11. A mass spectrometer system as recited in claim 10, wherein the computer-readable instructions that are adapted to define the m/z positions of the set of $n_{sb}$ finite-width bins are adapted to:
divide the m/z range of interest into $n_0$ equal width partitions that encompass the entire m/z range of interest, where $n_0 > n_{sb}$;
discard partitions that encompass fewer than $t_{sb}$ of the primary ion species; and
define each of the non-discarded partitions as a respective one the finite-width bins.

12. A mass spectrometer system as recited in claim 10, wherein the computer-readable instructions are further adapted to calculate the number, $n_{sb}$, of finite-width bins by dividing a known or estimated length of time, $t_e$, that is available for conducting a cycle of tandem mass spectral analyses by a tandem-mass-analysis repetition rate, $r_e$, of the mass spectrometer system.

13. A mass spectrometer system as recited in claim 10, wherein the computer-readable instructions are further adapted to define a width, $\Delta(m/z)$ of at least one bin.

14. A mass spectrometer system as recited in claim 13, wherein the computer-readable instructions that are adapted to define the width, $\Delta(m/z)$ of at least one bin are adapted to expand the width of a bin so that a number of m/z values of primary ion species encompassed by the bin is caused to increase to a value greater than the threshold, $t_{sb}$.

15. A method as recited in claim 1, wherein the compound class is one of the group consisting of: endogenous metabolites, therapeutics, prescription drugs, industrial chemicals, medicines, textile chemicals, dyes, pesticides, herbicides, drugs of abuse, illegal drugs, personal care products, cosmetics, excipients, colorants, steroids, vitamins, hormones, sports doping drugs, natural toxins and perfluorinated hydrocarbons.

16. A mass spectrometer system as recited in claim 10, wherein $t_{sb}=1$.

17. A mass spectrometer system as recited in claim 11, wherein $t_{sb}=1$.

* * * * *

UNITED STATES PATENT AND TRADEMARK OFFICE
CERTIFICATE OF CORRECTION

PATENT NO. : 12,009,194 B2
APPLICATION NO. : 17/550845
DATED : June 11, 2024
INVENTOR(S) : Philip M. Remes Page 1 of 1

It is certified that error appears in the above-identified patent and that said Letters Patent is hereby corrected as shown below:

In the Claims

In Column 15, Claim 10, Line 31, delete "retrieve," and insert -- retrieve --, therefor.

In Column 16, Claim 10, Line 4, delete "non" and insert -- $n_{sb}$ --, therefor.

Signed and Sealed this
Twenty-fourth Day of December, 2024

Derrick Brent
*Acting Director of the United States Patent and Trademark Office*